United States Patent [19]
Cabales et al.

[11] Patent Number: 6,155,932
[45] Date of Patent: Dec. 5, 2000

[54] GOLF SHAFT FOR CONTROLLING PASSIVE VIBRATIONS

[76] Inventors: Raymund S. Cabales, 238 Daisy Ave. #9, Imperial Beach, Calif. 91932; John B. Kosmatka, 2604 La Golondrina St., Carlsbad, Calif. 92009; Frank M. Belknap, 13531 Rostrata Rd., Poway, Calif. 92064

[21] Appl. No.: 09/347,904

[22] Filed: Jul. 6, 1999

Related U.S. Application Data

[62] Division of application No. 08/926,142, Sep. 9, 1997, Pat. No. 5,928,090.

[51] Int. Cl.[7] .................................................. A63B 53/10
[52] U.S. Cl. ........................................ 473/319; 473/521
[58] Field of Search .................................. 473/316–323, 473/520, 521

[56] References Cited

U.S. PATENT DOCUMENTS

| | | |
|---|---|---|
| 3,646,610 | 2/1972 | Jackson . |
| 3,974,012 | 8/1976 | Hogarth . |
| 4,280,700 | 7/1981 | Plagenhoef . |
| 4,889,575 | 12/1989 | Roy .......................................... 473/319 |
| 5,203,435 | 4/1993 | Doigis . |
| 5,294,119 | 3/1994 | Vincent et al. . |
| 5,427,373 | 6/1995 | Kusumoto . |
| 5,599,242 | 2/1997 | Solviche . |

OTHER PUBLICATIONS

Olcott et al, "Improved Vibration Damping in Composite Structures Using "Zig–Zag" Fibers and Embedded Viscoelastic Damping Layers", 38th International SAMPE Symposium, pp. 1357–1370, May 1993.

"Proceedings of Damping'91", Wright Laboratory, vol. III, Aug. 1991.

*Primary Examiner*—Jeanette Chapman
*Assistant Examiner*—Stephen L. Blau
*Attorney, Agent, or Firm*—Benman & Collins

[57] ABSTRACT

In the field of golf equipment, a new shaft design incorporates passive damping to suppress the vibrations excited in the shaft before and after impact. The design comprises a viscoelastic material sandwiched between multiple layers of composite plies which induce large shear strains in the viscoelastic when the shaft is subjected to bending, extension, or twist, thus increasing damping losses over conventional golf shafts. In one embodiment, the sandwiching layers are of opposing orientation. In another embodiment, the layers are oriented in an opposing V-shape laminate.

15 Claims, 8 Drawing Sheets

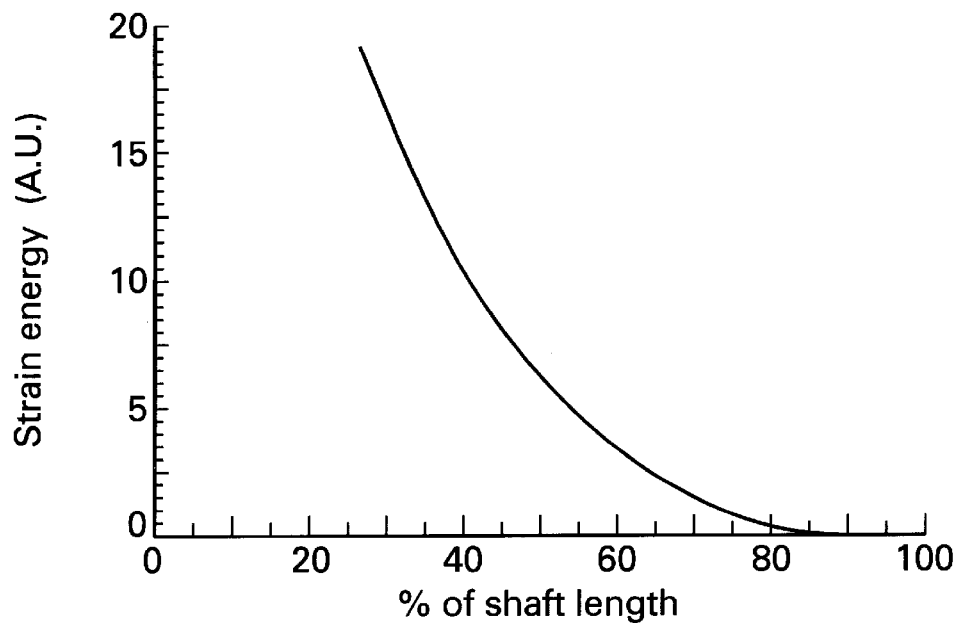
FIG. 6a
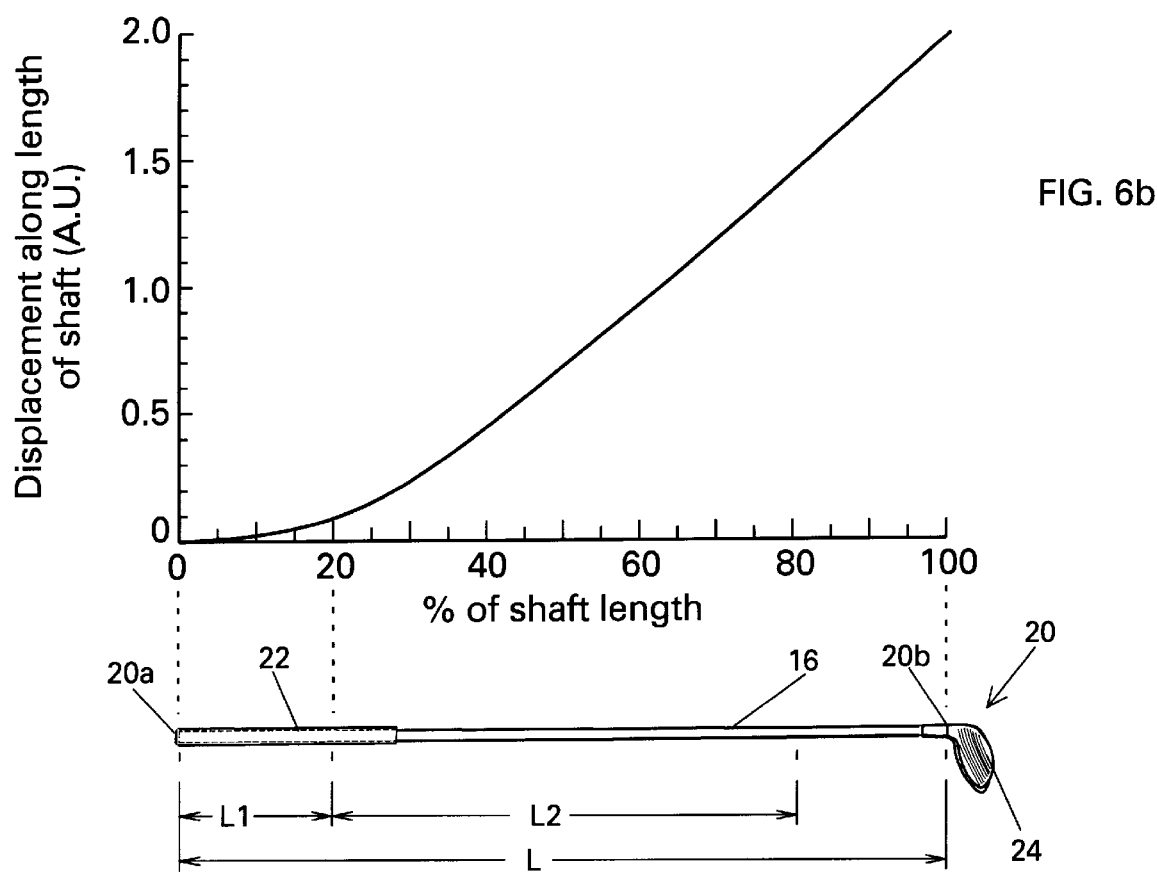
FIG. 6b
FIG. 6c

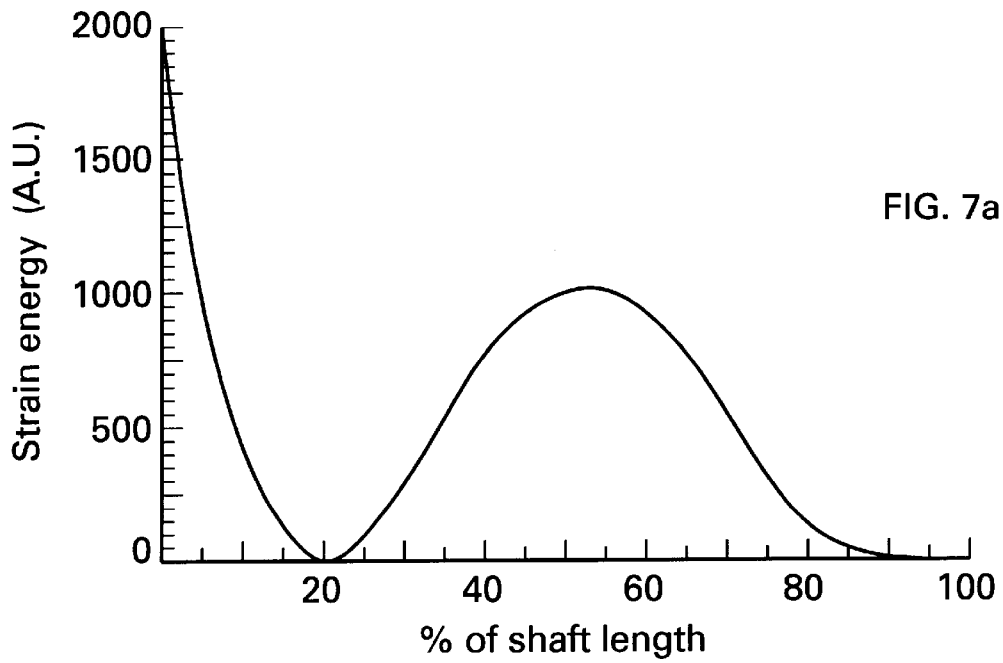
FIG. 7a
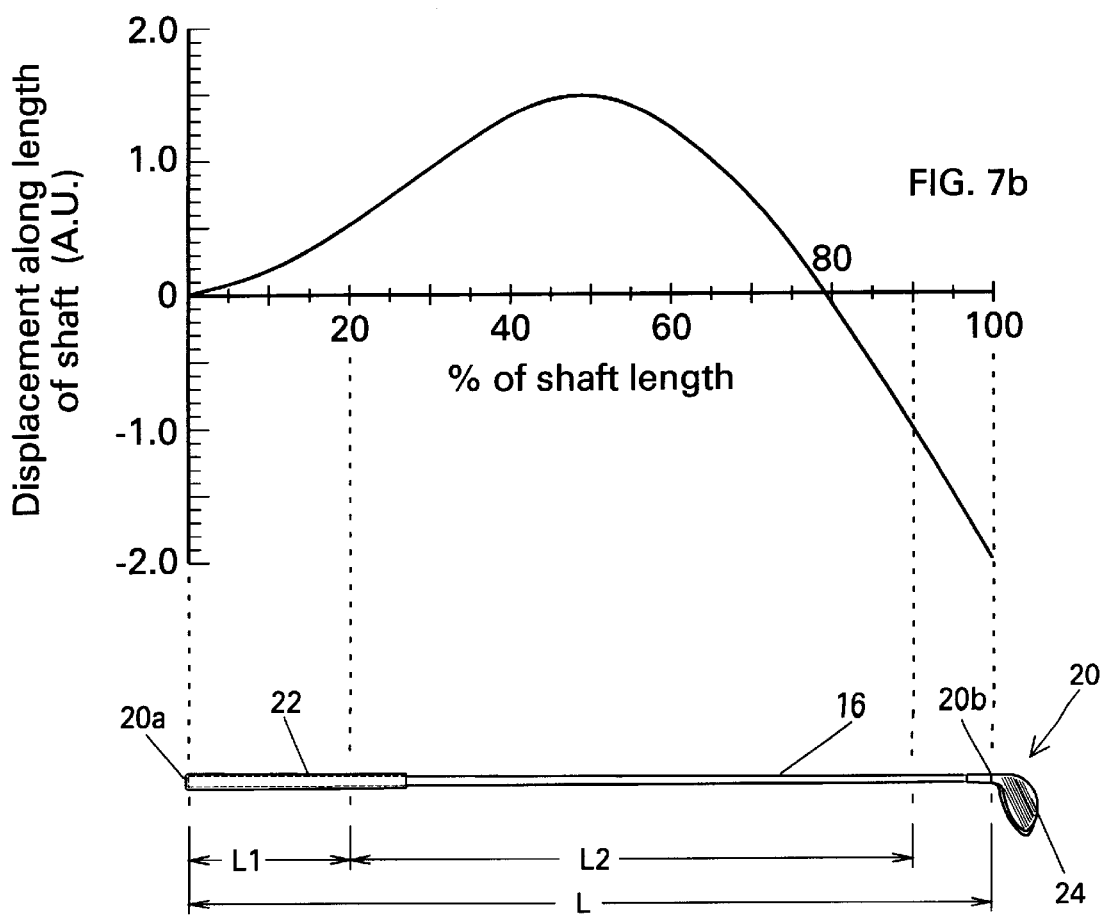
FIG. 7b
FIG. 7c

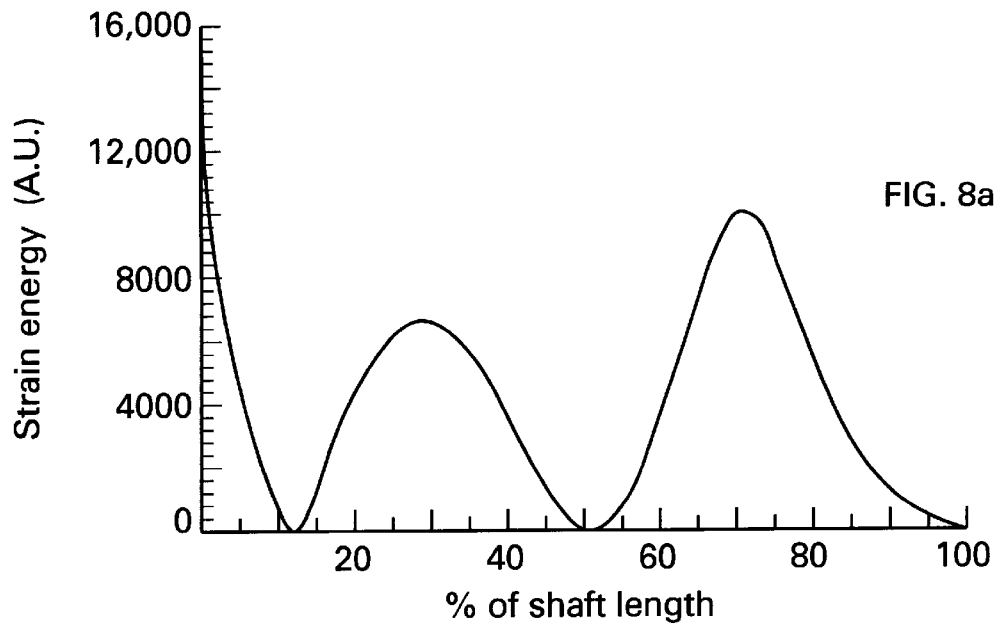
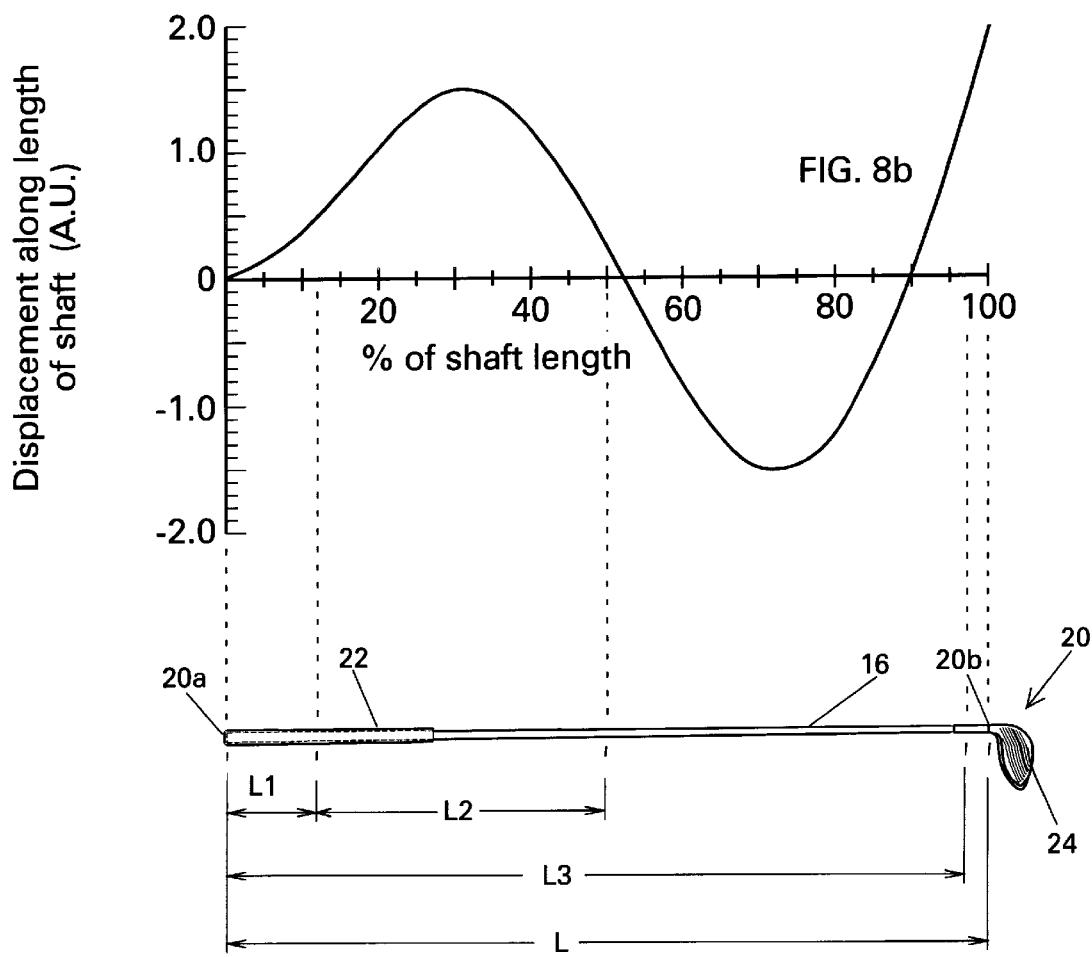

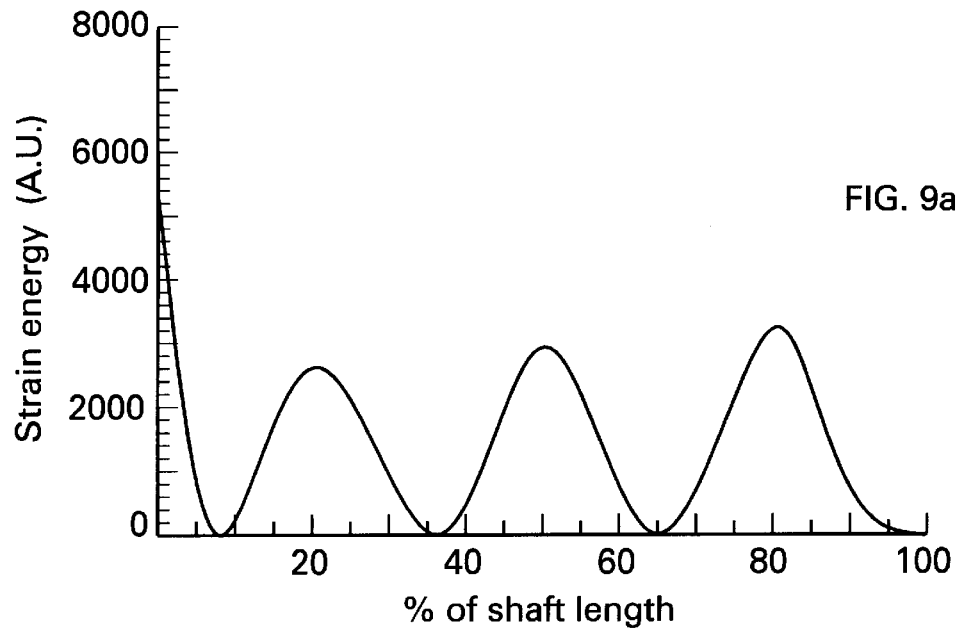
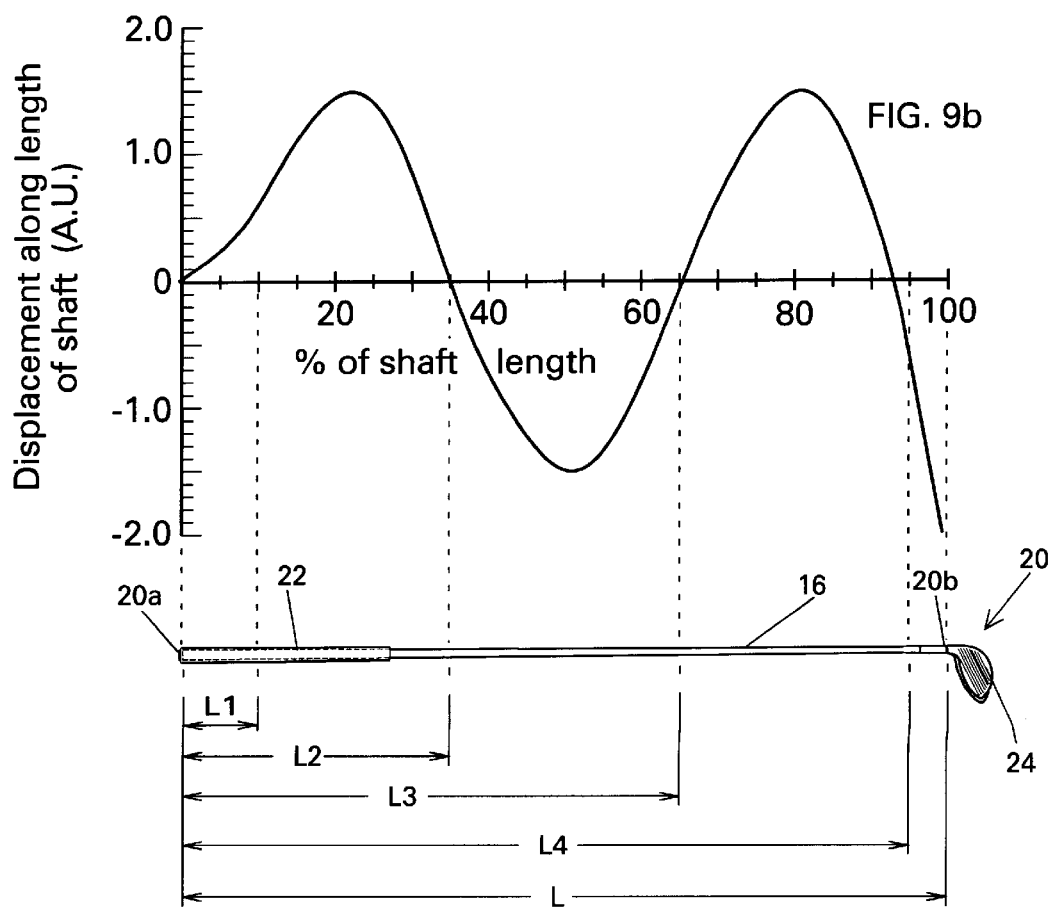
FIG. 9c

GOLF SHAFT FOR CONTROLLING PASSIVE VIBRATIONS

CROSS-REFERENCE TO RELATED APPLICATION

The present application is a divisional application of Ser. No. 08/926,142, filed Sep. 9, 1997, now U.S. Pat. No. 5,928,090.

TECHNICAL FIELD

The present invention relates generally to golf clubs, and, more particularly, to a golf club having an improved shaft for controlling passive vibrations.

BACKGROUND ART

Golf requires a combination of physical skill and mental toughness. Accuracy is required for lower scores. "Feel" is also a significant part of the game. The golfer analyzes the feedback or sensations after each shot to make necessary adjustments for mis-hits or to add consistency to his swing.

Studies show that the initiation of the downswing excites a torsional and bending impulse in the shaft which causes the clubhead to rotate from the optimal "square" position. Independent tests using a mechanical swing robot show that shot dispersion for a 220 yard drive averages approximately ±38 feet due to this head rotation. Regardless of the consistency of the swing, or the similarities of golf balls, a golfer's accuracy is at the mercy of his/her equipment.

It is also known that the impact of the clubhead on the golfball excites a vibratory phenomena through the shaft which propagates mto the golfer's hands and arms. Not only do these vibrations cause fatigue, they also play into the golfer's subconscious, as he/she adjusts his/her grip, his/her stance, or his/her swing in anticipation of this unpleasant sensation prior to each subsequent shot.

The golf shaft has an infinite number of vibratory mode shapes. Independent studies show that vibrations in a golf club are most readily detected at frequencies up to 750 Hertz. This value falls within the first four modes of a composite golf shaft. Thus, vibration damping is significant up to the fourth mode.

Conventionally, there have been a number of ways to incorporate damping into golf shaft design. Current techniques call for the placement of foam or rubber inserts into the bore of the shaft. Another design utilizes the theory of Constrained Layer Damping (CLD), where a viscoelastic adhesive is attached to the surface of a shaft by means of a rigid, constraining layer; see, e.g., U.S. Pat. No. 5,294,119, issued to Benoit Vincent et al on Mar. 15, 1994.

Each of these conventional designs has drawbacks. By adding a distinct damping device to an existing shaft, each of these designs adds weight to the completed club. All designs require the shaft to be the primary structural member. Finally, these designs only control damping when the shaft undergoes out-of-plane vibrations.

What is needed is a means of damping a golf shaft which avoids most, if not all, of the foregoing drawbacks.

DISCLOSURE OF INVENTION

It is therefore an object of the invention to provide passive damping in a golf shaft to control the rotation of the clubhead during the downswing. It is another object of the invention to provide passive damping in a golf shaft which suppresses vibrations at frequency ranges up to 750 Hertz.

It is yet another object of the invention to provide a damping system integral to a composite golf shaft.

These and other objects are achieved according to the invention through a composite golf shaft having a lower stress material, such as a viscoelastic material, sandwiched between layers which induce areas of large shear strain on the viscoelastic when the shaft is subjected to bending, twist, or extension.

In one embodiment, the sandwiching layers include one or several composite plies. The composite plies are disposed on each side of the viscoelastic material. The plies have respectively opposing orientations. Each layered ply on one side of the viscoelastic material has an opposing orientation to the respective ply on the other side of the viscoelastic material.

In further embodiments of the invention, the viscoelastic layer is sandwiched between opposing V-shaped or herringbone plies. A V-shaped ply is a ply where the fibers are laid at one angle along half a given length, and at an opposite orientation along the remaining half of the length. A herringbone ply is nothing more than a series of V-shaped plies connected end-to-end. These configurations create stress in the viscoelastic material using an "extension-twist" or a "tension-twist" coupling mechanism.

In all embodiments of the invention shown, the sandwiching plies are designed to yield high interlaminar shear. Vibration strain energy is transferred to the viscoelastic material and dissipated in the form of heat energy, which increases the damping performance of the shaft.

BRIEF DESCRIPTION OF THE DRAWINGS

FIGS. 6a–6c depict a graphical representation of the first mode of a composite golf shaft with corresponding strain energy curve and optimal placement of damping region relative to a golf club, wherein FIG. 6a is a plot on coordinates of strain energy (relative units) and percent of shaft length, FIG. 6b is a plot on coordinates of displacement along the length of the shaft and percent of shaft length, and FIG. 6c depicts the golf club aligned with the x-axes of FIGS. 6a–6b;

FIGS. 7a–7c depict a graphical representation of the second mode of a composite golf shaft with corresponding strain energy curve and optimal placement of damping region relative to a golf club, wherein FIG. 7a is a plot on coordinates of strain energy (relative units) and percent of shaft length, FIG. 7b is a plot on coordinates of displacement along the length of the shaft and percent of shaft length, and FIG. 7c depicts the golf club aligned with the x-axes of FIGS. 7a–7b;

FIGS. 8a–8c depict a graphical representation of the third mode of a composite golf shaft with corresponding strain energy curve and optimal placement of damping region relative to a golf club, wherein FIG. 8a is a plot on coordinates of strain energy (relative units) and percent of shaft length, FIG. 8b is a plot on coordinates of displacement along the length of the shaft and percent of shaft length, and FIG. 8c depicts the golf club aligned with the x-axes of FIGS. 8a–8b;

FIGS. 9a–9c depict a graphical representation of the fourth mode of a composite golf shaft with corresponding strain energy curve and optimal placement of damping region relative to a golf club, wherein FIG. 9a is a plot on coordinates of strain energy (relative units) and percent of shaft length, FIG. 9b is a plot on coordinates of displacement along the length of the shaft and percent of shaft length, and FIG. 9c is golf club aligned with the x-axis of FIGS. 9a–9b;

BEST MODES FOR CARRYING OUT THE INVENTION

Reference is now made in detail to specific embodiments of the present invention, which illustrate the best modes presently contemplated by the inventors for practicing the invention. Alternative embodiments are also briefly described as applicable.

Passive damping is defined as a method of reducing the effects of unwanted vibrations in a structure without the application or introduction of external energy. The present invention relates to passive damping in composite golf shafts.

In the preferred embodiments of the present invention below, a viscous damper, better known as a viscoelastic material (VEM) is sandwiched between off-axis plies, where the plies are designed to induce large amounts of shear strains in the VEM. Common examples of viscoelastic materials include Scotch™ ISD 112, ISD 110, and AF-32. Through hysteresis losses, vibration energy is converted to thermal energy, which is dissipated to the environment in the form of heat. Thus, through proper incorporation of the VEM, high levels of shock absorption may be obtained.

Figure 1:
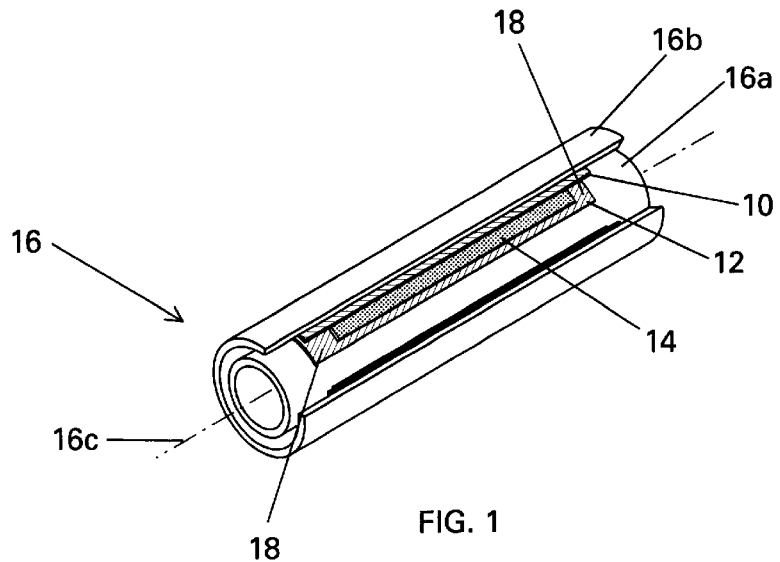
FIG. 1 is a perspective view in cross-section of a golf shaft, illustrating an embodiment of the invention, utilizing opposing plies.

Such an embodiment is illustrated in FIG. 1. The plies 10, 12 are disposed on each side of the VEM, denoted at 14, with opposed off-axis orientations, and placed integral to the shaft structure 16a, 16b, where the shaft structure comprises an inner shaft 16a separated from an outer shaft 16b by the plies 10, 12 and the VEM 14.

The composite plies are composed of (a) either a natural fiber (carbon, Kevlar®, or boron) or a synthetic fiber (fiberglass or polyester) embedded in (b) either a thermoset resin (epoxy, polyester, vinyl-ester, or cyanate-ester) or a thermoplastic resin (polyetheretherketone—PEEK or Fiberite® APC-2). This gives rise to four possible combinations of fibers and resins, ranging from the conventional graphite-epoxy to the latest sheet-molding compound (SMC) materials.

Figure 2:
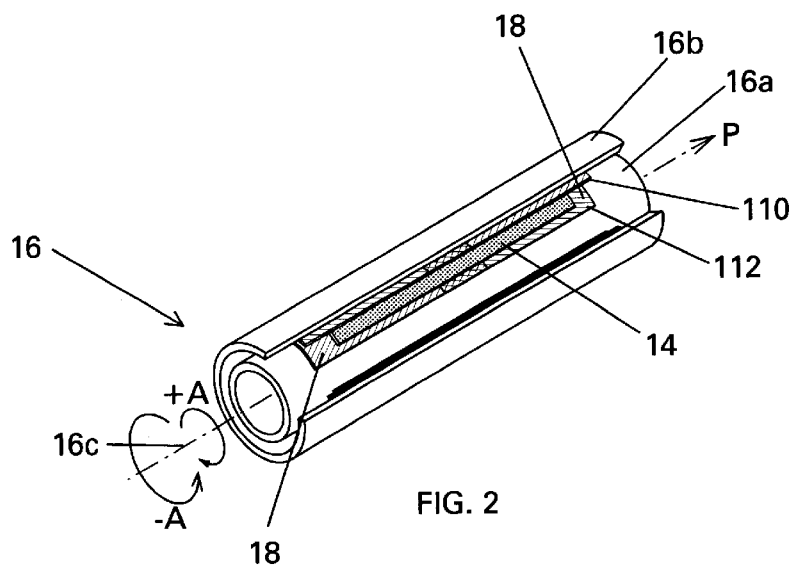
FIG. 2 is a perspective view in cross-section of a golf shaft, illustrating another embodiment of the invention, utilizing V-shaped plies.
Figure 3:
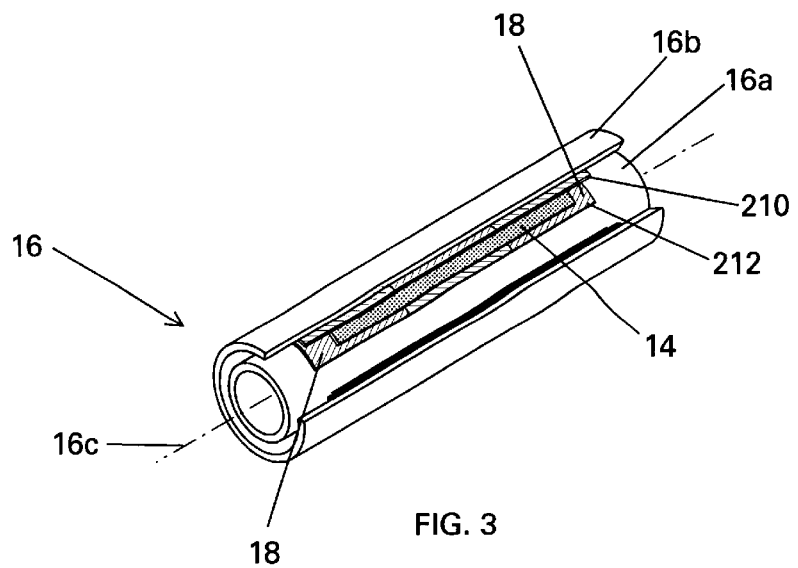
FIG. 3 is a perspective view in cross-section of a golf shaft, illustrating yet another embodiment of the invention, utilizing a herringbone ply configuration.

The shaft structure comprises any of the well-known composite materials, or fiber-reinforced plastics, such as carbon, aramid, boron, fiberglass, or any combination thereof. For instance, ply 10 has an angle with respect to the centerline 16c of the shaft 16 of +15° to +22°, while ply 12 has an angle with respect to the centerline of the shaft of −15° to −22°. Orientation angles of 0° to ±30° are known to affect "feel" by damping the unpleasant vibratory phenomena after impact, while angles of ±30° to ±60° are known to provide "control" by reducing clubhead rotation prior to impact. Furthermore, in the embodiment depicted in FIG. 1, the two sandwiching plies 10, 12 are fused together at the overlap regions 18, providing a load path between both plies. The amount of overlap is at least 0.25 inch; there is no maximum in overlap, other than the practical considerations dictated by the length of the golf shaft 16. A damping region 19 extends from one end of the plies 10, 12 to the other end, as shown in FIGS. 1–3.

Figure 1A:
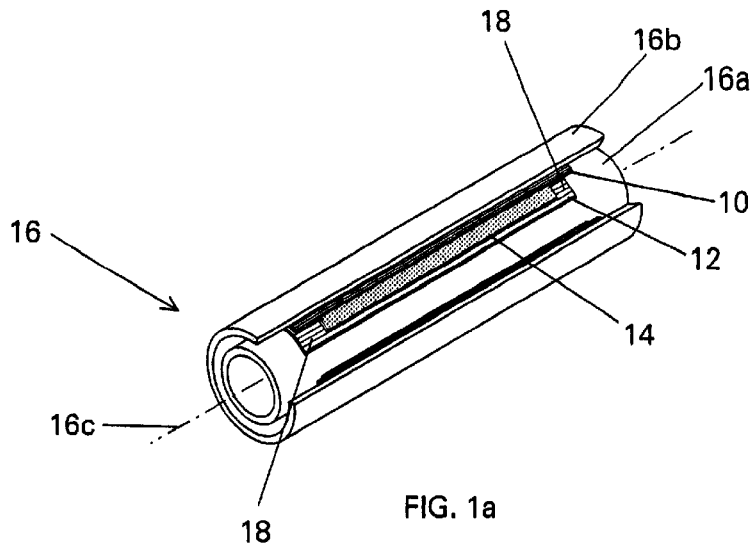
FIGS. 1a–1c depict alternate embodiments in which both plies are axially oriented (FIG. 1a), both plies are traverse oriented (FIG. 1b), and one ply is axially oriented and the other is transverse oriented (FIG. 1c)
Figure 1B:
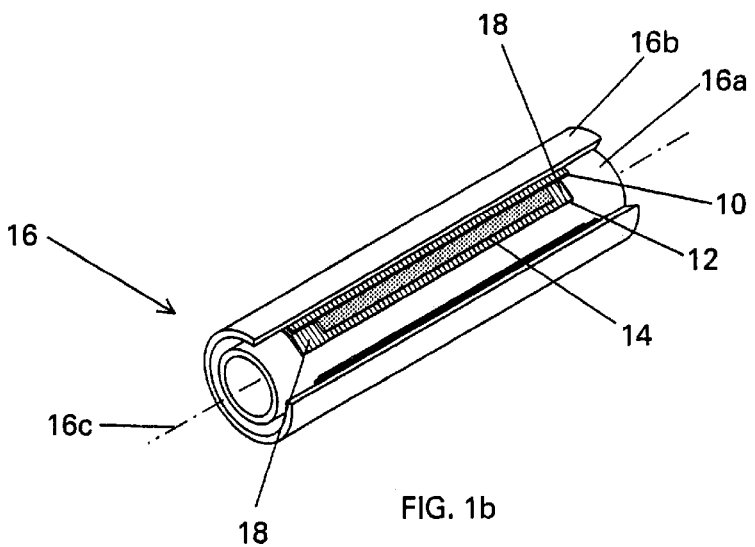
Figure 1C:
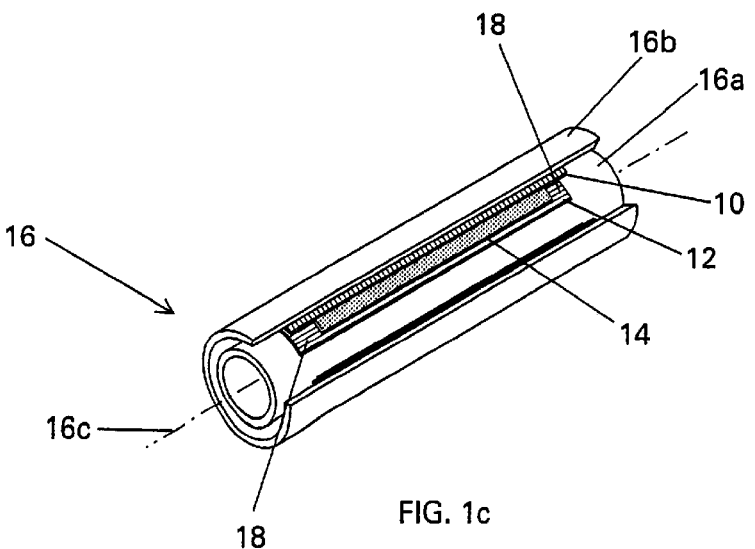

FIG. 1a depicts one embodiment in which the plies 10 and 12 are both aligned axially. FIG. 1b depicts a second embodiment in which the plies 10 and 12 are aligned transverse to the shaft axis 16c. FIG. 1c depicts a third embodiment in which one of the plies 10, 12 is axial and the other 12, 10 is transverse (it is immaterial as to whether the outer ply or inner ply is one orientation or the other).

The application of an extensional, bending, or twisting load will cause the two opposing plies, or shells, 10, 12 to counter-rotate. The resulting interlaminar shear force between the counter-rotating plies 10, 12 stresses the VEM 14 to impose an "extension-twist" or a "tension-twist" coupling and thereby obtain vibration damping. Based on the theory that damping is inherent in composite laminates and vibration is lost through interfacial plies, this coupling action increases the damping level by having the counter-rotating shells 10, 12 react to the load force and apply additional damping in the "twist" direction.

Studies show that damping is further enhanced by the introduction of V-shaped or herringbone plies. Such embodiments are illustrated in FIGS. 2 and 3, respectively.

A V-shaped ply, as shown in FIG. 2, is a ply where the fibers along the first half of the damping region are laid up at a positive angle with respect to the shaft centerline 16c (e.g. +20°) and fibers along the remaining half are orientated at a negative angle (e.g. −20°). It is important to note that in the FIG. 2 embodiment, ply 110 has an opposing orientation to ply 112 throughout the length of the ply.

As seen in FIG. 2, the application of an axial load will cause the central cross-section of the outer shell, or ply, 110 to rotate in a direction "A". Concurrently, the central cross-section of the inner shell, or ply, 112 to rotate in a direction "−A". The relative motion of the central cross-sections of the two shells 110, 112 doubles.

These transverse motions, and thus resulting shear strains, are greatest in the areas where the fiber orientation angle changes. Therefore, if the fiber orientation angle is varied, several times along the length of the shells using a herringbone configuration, as shown in FIG. 3, areas of significant shear strain will be produced. As with the previous embodiments, ply 210 on one side of the VEM 14, has an opposing orientation to ply 212, on the other side of the VEM. It can be seen that placement of VEM 14 between these shells 210, 212 acts as a damper for the axial shocks. With this design, the more energy transferred into the VEM 14, the higher the shock absorption.

Figure 4:
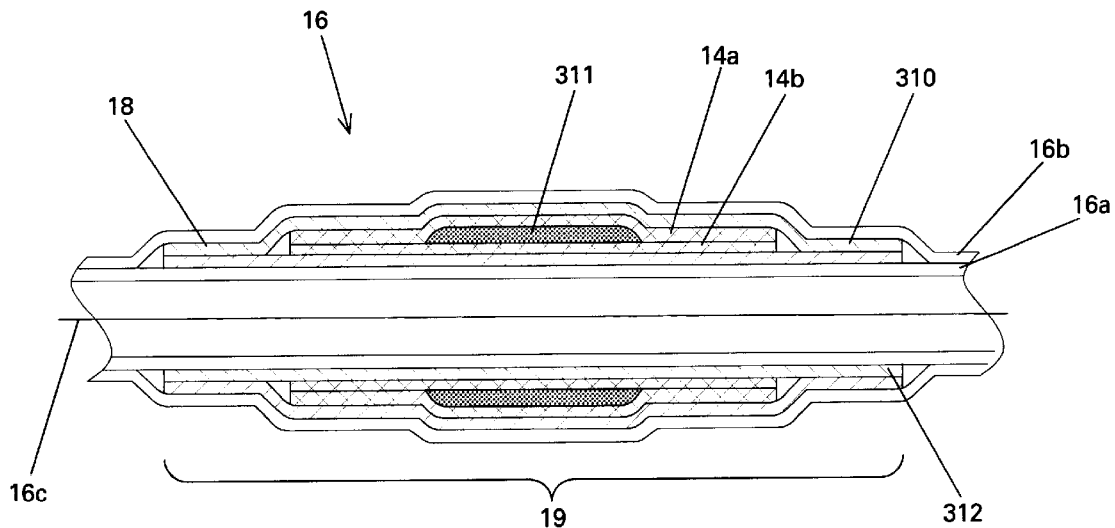
FIG. 4 is a cross-sectional view of a golf shaft, depicting the use of multiple layers, with the intermediate ply being free-floating.
Figure 5:
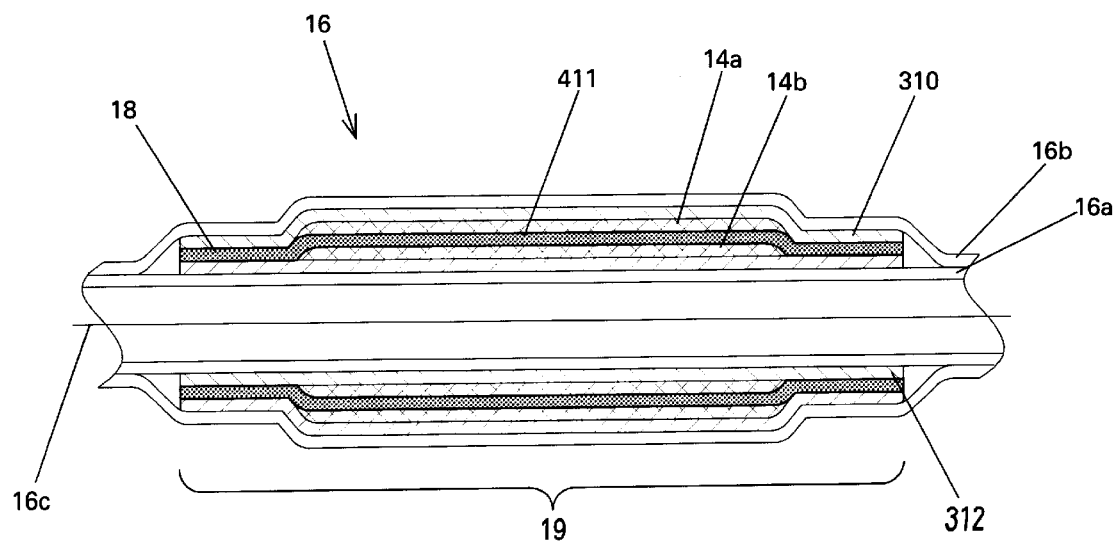
FIG. 5 is a view similar to that of FIG. 4, but with the intermediate ply being attached to the structure.

FIGS. 4 and 5 illustrate the use of multiple layers of the preferred embodiment. FIG. 4 shows an intermediate ply 311 placed at the mid-plane between the opposing plies 310, 312, and two VEM layers 14a, 14b. This intermediate ply 311 is shown free-floating, or unsecured, within the damping region 19. FIG. 5 shows the intermediate ply 411 secured to the outer and inner plies, or structure, 310, 312. In either of these two embodiments, the intermediate layer 311, 411 can be of different material orientation. Securement of the intermediate ply 411 with the sandwiching plies 310, 312 is accomplished during curing of the golf shaft.

The manufacturing process consists of placing the individual layers of materials in or around a mold to form the completed laminate structure. The shaft is then heated at temperatures within the range of 50° to 400° F. for periods of time within the range of 15 minutes to 5 hours, wherein the matrix binder or resin cures and bonds to form a homogeneous material.

Interlaminar shear, inherent in all composite structures, lends itself to a variety of other embodiments to induce strain energy in the VEM for the purpose of sup pressing passive vibrations. Such embodiments include sandwiching the VEM between unidirectional axial (0°) plies (fiber orientation along the axis or centerline of the shaft), between unidirectional transverse (90°) plies (fiber orientation running transverse to the axis of the shaft), or any combination thereof FIGS. 6 through 9 show graphs of mode shapes (FIGS. 6b, 7b, 8b, 9b), resultant strain energy in the shaft (FIGS. 6a, 7a, 8a, 9a), and illustrations of optimal placement of the damping region in the shaft 16 to control the respective mode (FIGS. 6c, 7c, 8c, 9c). As seen in FIGS. 8 and 9, multiple damping regions may be utilized to take advantage of the maximum areas of strain energy in the shaft.

Depicted in FIGS. 6c, 7c, 8c, and 9c is a conventional golf club 20, comprising the shaft 16, at one end 20a (the butt end) of which is located a grip 22 and at the other end 20b (the tip) of which is located a head 24.

As seen from FIGS. 6a–6c, the viscoelastic material 14 is placed a distance L1 from the butt end 20a, equal to a minimum of 20% of the total shaft length L, extending downwards towards the tip, or head, 24 and terminating at a distance L2, equal to a maximum of 80% of the total shaft length from the butt end 20a to specifically control the first vibrational mode of the shaft 16. The viscoelastic material 14 is placed so that one end starts at 20% down the shaft. The other end terminates at or before 80% of the shaft length. The minimum length of the VEM 14 is 1 inch; the maximum length is the distance L2.

As seen from FIGS. 7a–7c, the viscoelastic material 14 is placed a distance L1 from the butt end 20a, equal to a minimum of 20% of the total shaft length L, extending downwards towards the tip 24 and terminating at a distance L2, equal to a maximum of 90% of the total shaft length to specifically control the second vibrational mode of the shaft 16. Again, one end of the VEM 14 is placed so that it starts at 20% down the shaft. The other end terminates at or before 90% of the shaft length.

Again, the maximum length is the distance L2.

As seen from FIGS. 8a–8c, the viscoelastic material 14 is placed in two sections along the shaft 16, where the first section is located a distance L1 from the butt end, equal to a minimum of 15% of the total shaft length L, extending downwards towards the tip 24 and terminating at a distance L2, equal to a maximum of 50% of the total shaft length from the butt end 20a, and the second section is located a distance L2 from the butt end, equal to a minimum of 50% of the total shaft length L from the butt end, extending downwards towards the tip and terminating at a distance L3, equal to a maximum of 95% of the total shaft length from the butt end to specifically control the third vibrational mode of the shaft. One end of the first VEM 14 is placed so that it starts 15% down the shaft and terminates at or before 50% of the shaft length, while one end of the second VEM 14 is placed so that it starts 50% down the shaft and terminates at or before 95% of the shaft length. The maximum length is thus L2–L1 for the first VEM 14 and L3–L2 for the second VEM.

As seen from FIGS. 9a–9c, the viscoelastic material 14 is placed in three sections along the shaft 16, where the first section is located a distance L1 from the butt end 20a, equal to a minimum of 10% of the total shaft length L, extending downwards towards the tip 20b and terminating at a distance L2, equal to a maximum of 35% of the total shaft length from the butt end, the second section is located a distance L2 from the butt end, equal to a minimum of 35% of the total shaft length L from the butt end, extending downwards towards the tip and terminating at a distance L3, equal to a maximum of 65% of the total shaft length from the butt end, and the third section is located a distance L3 from the butt end, equal to a minimum of 65% of the total shaft length L from the butt end, extending downwards towards the tip and terminating at a distance L4, equal to a maximum of 95% of the total shaft length from the butt end to specifically control the fourth vibrational mode of the shaft. One end of the first VEM 14 is placed so that it starts 10% down the shaft and terminates at or before 35% of the shaft length, one end of the second VEM 14 is placed so that it starts 35% down the shaft and terminates at or before 65% of the shaft length, and one end of the third VEM 14 is placed so that it starts 65% down the shaft and terminates at or before 95% of the shaft length. The maximum length is thus L2–L1 for the first VEM 14, L3–L2 for the second VEM, and L4–L3 for the third VEM.

Four separate clubs may be fabricated, each one directed to deal with a specific vibrational mode, employing the teachings of FIGS. 6–9, as described above. Alternatively, a single club, which incorporates sufficient VEM 14 to dampen all four vibrational modes. One way to do this would be to provide VEM 14 running the entire length of the shaft.

Figure 10:
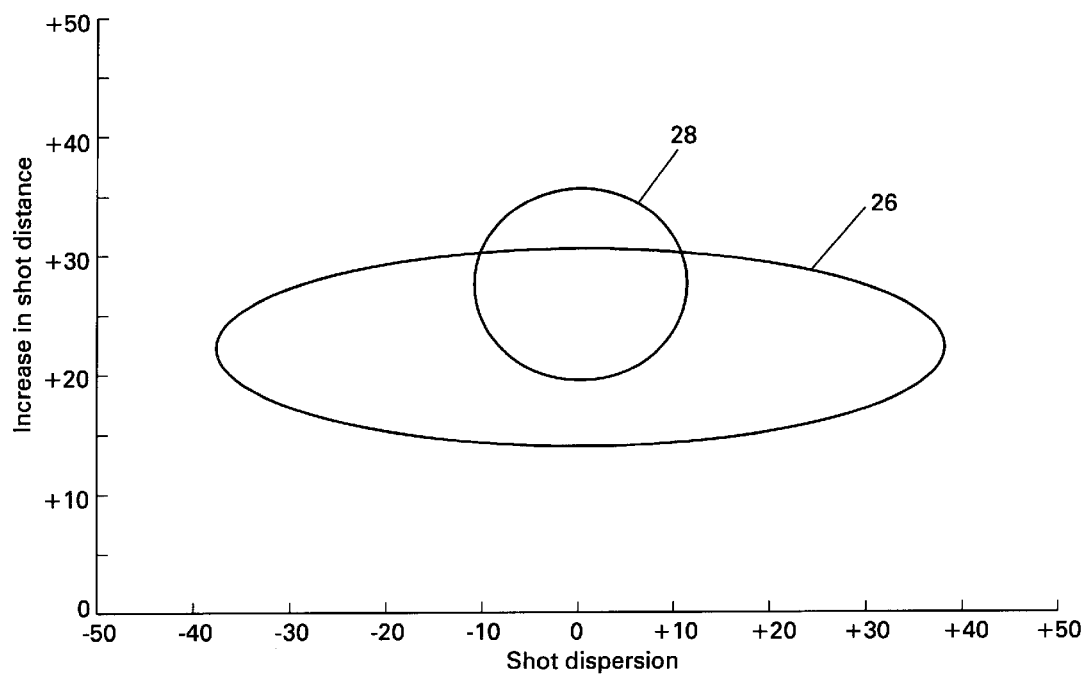
FIG. 10, on coordinates of shot distance (in yards) and shot dispersion, is a graphical illustration of shot dispersion with a conventional shaft and with a damped shaft.

FIG. 10 is a plot of actual shot dispersion (Curve 26) of conventional shafts and predicted shot dispersion (Curve 28) for the damped shaft of the present invention. From this graph, it can be seen that the straighter the shot, the closer the ball will land toward the target.

The golf shaft of the present invention may also be designed with any of combination of the described embodiments to affect the stiffness of the shaft. Just as a spring increases rigidity as it compresses, a series of damping regions placed along the shaft can increase the bending stiffness with increased swing speed, thereby creating a variable flex golf club.

The shaft portion 16a, 16b of the golf club may manufactured by a number of different processes, including bladder-molding, roll-wrapping, and filament-winding.

The process of hand-wrapping is defined as the lay-up of resin or matrix 20 impregnated fiber material around a male mandrel.

Bladder-molding is accomplished by the lay-up of resin or matrix-impregnated fiber material over an inflatable bladder, wherein the laminate is placed within a female tool and the bladder is inflated to take the shape of the tool.

Filament winding is the process where continuous reinforcements or fibers impregnated with a matrix either previously or during the winding process are placed over a rotating or removable form or mandrel. With this process, fiber orientation is easily changed along the length of the ply.

It is worthwhile to note that in any of the aforementioned manufacturing processes, the addition of damping region(s) may cause a visible change to the contour of the shaft, which differs from that of a conventional golf club.

The benefits of a golf shaft incorporating the teachings of the present invention extends into educational aspects as well as game improvement. A training aid designed specifically to control vibrations after impact would allow a golfer to improve his/her swing without experiencing the typical unpleasant vibratory phenomena. In essence, mis-hits would be seen, but not felt.

The foregoing structure, comprising the VEM 14 sandwiched between two composite plies, is useful in a variety of other applications, including sporting goods, mechanical engineering, and the medical industry. With regard to sporting goods, the structure may find use in baseball (bat), tennis (racquet), hockey (stick), racquetball (racquet), bicycling (bicycle frame), badminton (racquet), squash (racquet), and archery (bow). With regard to mechanical engineering, the structure may find use as handles for power tools (drill motors, saws, grinders, power drivers, and the like) and handles for hand-held tools Rammers, axes, picks, hatchets, saws, and the like). With regard to applications in the medical industry, the structure may find use as canes, crutches, and prosthetic devices. In all the foregoing applications, the intent is to suppress vibrations in the instrument to allay the shock of impact, to reduce the vibrations which lead to fatigue, tennis elbow, carpel tunnel, or other ailments, and to minimize the vibrations which affect accuracy due to the impulse excited from any change in direction of force.

INDUSTRIAL APPLICABILITY

The golf shaft of the invention, provided with passive damping, is expected to find use in golf clubs, as well as a number of other articles, where passive damping is an added benefit.

Thus, there has been disclosed a golf shaft provided with passive damping. It will be apparent to those skilled in this art that various changes and modifications of an obvious nature may be made; all such changes and modifications are considered to fall within the scope of this invention.

What is claimed is:

1. A tubular composite golf shaft forming a part of a golf club having a grip terminating in a butt end and a head attached to a tip opposite said butt end, said golf shaft provided with at least one integral damping device, said golf shaft comprising an inner shaft member and an outer shaft member, said at least one integral passive damping device comprising at least two tubular members whose length defines a damping region, said at least two tubular members disposed one inside the other and separated by at least one layer of viscoelastic material, said tubular members being connected to each other at the ends of the damping region, said integral passive damping device disposed between said inner shaft member and said outer shaft member, wherein each of said tubular members comprise at least one composite ply, wherein each composite ply surrounding said viscoelastic material has an off-axis ply orientation, and wherein said tubular members are non-rigid such that said plies experience relative twist displacements about the central axis of said shaft as a result of shaft bending or extension, which induce shear strains in said viscoelastic material for the purpose of controlling passive vibrations.

2. The tubular composite golf shaft of claim 1, wherein each of said tubular members comprises at least one composite ply, where each composite ply surrounding said viscoelastic material has an off-axis ply orientation, the orientation of one ply opposing the orientation of the other.

3. The tubular composite golf shaft of claim 1, wherein each of said tubular members comprises a least one composite ply, where each composite ply surrounding said viscoelastic material has a unidirectional ply orientation.

4. The tubular composite golf shaft of claim 1, wherein each of aid tubular members comprises at least one composite ply, where each composite ply surrounding said viscoelastic material has a unidirectional transverse ply orientation.

5. The tubular composite golf shaft of claim 1, wherein each of said tubular members comprises at least one composite ply, where each composite py surrounding said viscoelastic material is oriented in a V-shape.

6. The tubular composite golf shaft of claim 1, wherein each of said tubular members comprises at least one composite ply, where each composite ply surrounding said viscoelastic material is oriented in a herringbone pattern.

7. The tubular composite golf shaft of claim 1, comprising multiple tubular members, disposed one inside the other, wherein each of said members is separated from another by at least one layer of viscoelastic material, and an additional intermediate tubular member is sandwiched between said viscoelastic material and is secured to said tubular members.

8. The tubular composite golf shaft of claim 7, wherein said intermediate tubular member is of the same material and orientation as that of said tubular members, different material and orientation as that of said tubular members, or a combination thereof.

9. The tubular composite golf shaft of claim 1, wherein said golf shaft has a full length L.

10. The tubular composite golf shaft of claim 9, wherein said plies are oriented at $\pm 30°$ to $\pm 60°$ with respect to the axis of the shaft to provide better control and to minimize shot dispersion by reducing rotation of said head with respect to said golf shaft prior to impact of said golf club with a golf ball.

11. The tubular composite golf shaft of claim 9, wherein said viscoelastic material is placed a distance L1 from said butt end, equal to a minimum of 20% of said total shaft length L, extending downwards towards said tip and terminating at a distance L2, equal to a maximum of 80% of said total shaft length from said butt end to specifically control a first vibrational mode of said shaft.

12. The tubular composite golf shaft of claim 9, wherein said viscoelastic material is placed a distance L1 from said butt end, equal to a minimum of 20% of said total shaft length L, extending downwards towards said tip and terminating at a distance L2, equal to a maximum of 90% of said total shaft length to specifically control a second vibrational mode of said shaft.

13. The tubular composite golf shaft of claim 9, wherein said viscoelastic material is placed in two sections along said shaft, where a first section is located a distance L1 from said butt end, equal to a minimum of 15% of said total shaft length L, extending downwards towards said tip and terminating at a distance L2, equal to a maximum of 50% of said total shaft length from said butt end, and a second section is located a distance L2 from said butt end, equal to a minimum of 50% of said total shaft length L from said butt end, extending downwards towards said tip and terminating at a distance L3, equal to a maximum of 95% of said total shaft length from said butt end to specifically control a third vibrational mode of said shaft.

14. The tubular composite golf shaft of claim 9, wherein said viscoelastic material is placed in three sections along said shaft, where a first section is located a distance L1 from said butt end, equal to a minimum of 10% of said total shaft length L, extending downwards towards said tip and terminating at a distance L2, equal to a maximum of 35% of said total shaft length from said butt end, a second section is located a distance L2 from said butt end, equal to a minimum of 35% of said total shaft length L from said butt end, extending downwards towards said tip and terminating at a distance L3, equal to a maximum of 65% of said total shaft length from said butt end, and a third section is located a distance L3 from said butt end, equal to a minimum of 65% of said total shaft length L from said butt end, extending downwards towards said tip and terminating at a distance L4, equal to a maximum of 95% of said total shaft length from said butt end to specifically control a fourth vibrational mode of said shaft.

15. The tubular composite golf shaft of claim 1, wherein said composite plies are composed of (a) either a natural fiber or a synthetic fiber embedded in (b) either a thermoset resin or a thermoplastic resin.

* * * * *